United States Patent
Goerlach et al.

(10) Patent No.: US 9,172,310 B2
(45) Date of Patent: Oct. 27, 2015

(54) GENERATOR INCLUDING A RECTIFIER SYSTEM FOR THE ELECTRICAL VOLTAGE SUPPLY OF A MOTOR VEHICLE

(75) Inventors: Alfred Goerlach, Kusterdingen (DE); Markus Baur, Rottenburg (DE)

(73) Assignee: ROBERT BOSCH GMBH, Stuttgart (DE)

(*) Notice: Subject to any disclaimer, the term of this patent is extended or adjusted under 35 U.S.C. 154(b) by 844 days.

(21) Appl. No.: 12/744,652

(22) PCT Filed: Dec. 8, 2008

(86) PCT No.: PCT/EP2008/067004
§ 371 (c)(1),
(2), (4) Date: May 25, 2010

(87) PCT Pub. No.: WO2009/077369
PCT Pub. Date: Jun. 25, 2009

(65) Prior Publication Data
US 2010/0259137 A1   Oct. 14, 2010

(30) Foreign Application Priority Data
Dec. 14, 2007   (DE) .......................... 10 2007 060 231

(51) Int. Cl.
*H02K 11/04*   (2006.01)
*H02M 7/219*   (2006.01)
*H02M 7/217*   (2006.01)

(52) U.S. Cl.
CPC .............. *H02M 7/219* (2013.01); *H02M 7/217* (2013.01); *H02M 2007/2195* (2013.01); *Y02B 70/1408* (2013.01)

(58) Field of Classification Search
CPC ..................... H02M 7/219; H02M 2007/2195; H02M 3/33592; H02M 7/217; Y02B 70/1408; Y02B 70/1475

USPC ...................... 363/123, 125–129, 146, 52, 53
See application file for complete search history.

(56) References Cited

U.S. PATENT DOCUMENTS 4,473,757 A * 9/1984 Farago et al. ................. 307/127
4,507,525 A * 3/1985 Siligoni et al. ............... 379/412
(Continued)

FOREIGN PATENT DOCUMENTS

DE          195 49 202       7/1997
WO         2007/072226       6/2007

OTHER PUBLICATIONS

Johann W. Kolar et al : "Vienna Rectifier II—A Novel Single-Stage High-Frequency Isolated Three-Phase PWN Rectifier System" IEEE Transactions on Industrial Electronics, IEEE Service Center, Piscataway, NJ, USA, vol. 46, No. 4, Aug. 1, 1999, pp. 674-691, XP011023542, ISSN : 0278-0046, p. 6754 ; figure Id.
(Continued)

*Primary Examiner* — Fred E Finch, III
*Assistant Examiner* — Gustavo Rosario Benitez
(74) *Attorney, Agent, or Firm* — Kenyon & Kenyon LLP

(57) ABSTRACT

A generator, for example a three-phase generator including an associated rectifier system, is used, for example for the electrical voltage supply of a motor vehicle. The AC voltage produced by the generator is rectified by the rectifier system having a plurality of rectifying elements 2, 7. Rectifying elements 2 of the rectifier have a plurality of series connections of a self-conducting n-channel JFET and a self-conducting p-channel JFET, the gate terminals being connected to the outer source or drain terminals of the other transistor. Alternatively, the self-conducting JFETS of the rectifying element 2 in FIG. 1 may be replaced by self-conducting MOS field effect transistors (depletion mode MOSFET). The p-channel JFET of the exemplary embodiment according to FIG. 1 is replaced by a self-conducting p-channel MOSFET and the n-channel JFET is replaced by a self-conducting n-channel MOSFET. Furthermore, the gate terminals are connected to the diametrically opposed outer terminals.

15 Claims, 2 Drawing Sheets

(56) References Cited

U.S. PATENT DOCUMENTS

| | | | | |
|---|---|---|---|---|
| 4,958,119 | A | * | 9/1990 | Fitzner ............................ 322/91 |
| 5,742,463 | A | * | 4/1998 | Harris ............................. 361/88 |
| 5,744,921 | A | * | 4/1998 | Makaran ................. 318/400.34 |
| 5,781,420 | A | * | 7/1998 | Xia et al. .................... 363/21.06 |
| 5,870,031 | A | * | 2/1999 | Kaiser et al. ............... 340/10.34 |
| 6,166,930 | A | * | 12/2000 | Czerwinski .................... 363/44 |
| 6,549,439 | B1 | * | 4/2003 | Yu ................................ 363/127 |
| 6,819,012 | B1 | * | 11/2004 | Gabrys ........................... 307/68 |
| 2002/0196002 | A1 | * | 12/2002 | Diallo et al. ................. 323/276 |
| 2003/0168919 | A1 | * | 9/2003 | Friedrichs et al. ............ 307/113 |
| 2006/0072352 | A1 | * | 4/2006 | Ghosh et al. ..................... 363/53 |
| 2006/0076626 | A1 | * | 4/2006 | Watanabe et al. ............. 257/355 |
| 2010/0073978 | A1 | * | 3/2010 | Schaffer et al. ............... 363/127 |
| 2011/0124310 | A1 | * | 5/2011 | Theilmann et al. ........ 455/343.1 |

OTHER PUBLICATIONS

International Search Report in International Application No. PCT/EP2008/067004, dated May 13, 2009.

* cited by examiner

GENERATOR INCLUDING A RECTIFIER SYSTEM FOR THE ELECTRICAL VOLTAGE SUPPLY OF A MOTOR VEHICLE

FIELD OF THE INVENTION

The present invention relates to a generator including an associated rectifier system, in particular a three-phase generator for motor vehicles.

BACKGROUND INFORMATION

Three-phase generators are normally used for the supply of electrical voltage or current for the consumers of a motor vehicle. Such three-phase generators are designed to have three or more phases. For the generation of the needed direct voltage or the needed direct current, the generators or three-phase generators used include rectifiers having rectifying elements which in a three-phase generator are normally made up of six silicon pn diodes. Normally the diodes are packaged in a press-fit housing and pressed into openings of the rectifier provided for this purpose. Such press-fit diodes are discussed, for example, in DE-195 49 202 A.

Conventional rectifiers having diodes of the above-mentioned design have forward power losses caused by the unavoidable forward voltages of the pn diodes. This is accompanied by a deterioration of the efficiency of the generator. Since on average two diodes are always connected in series, the mean forward power losses in a 100 ampere generator are approximately 200 watts. The heating of the diodes or of the rectifier caused by these losses must be reduced by complex cooling measures, for example a suitable heat sink and an associated fan.

A significant reduction of the voltage loss and accordingly an enhancement of the efficiency of a generator are able to be achieved by using power field effect transistors instead of diodes. In order to function as rectifiers, such power field effect transistors must be actively triggered. Such an active rectification is substantially more complex than a simple diode rectification in conventional rectifiers, since additional triggering electronics are needed for active rectification. In this connection, the thermal-mechanical design of the generator must be completely reconfigured for the use of power field effect transistors compared to conventional generators.

SUMMARY OF THE INVENTION

In contrast, the generator according to the exemplary embodiments and/or exemplary methods of the present invention including an associated rectifier system having the advantageous rectifying elements has the advantage that the voltage drop in the rectifying elements turns out to be significantly lower than in customary diode rectifiers having silicon pn diodes. In principle, the circuitry of the exemplary embodiments and/or exemplary methods of the present invention makes it possible to achieve a lower voltage drop than would otherwise be possible with field effect transistors only. This is a significant advantage compared to diode rectifiers in which at least a forward voltage or diffusion voltage of approximately 0.8 volts must be applied as a matter of principle.

The rectifier system advantageously made up of two semiconductor chips as a component of a generator may be packaged in a housing, which may be in a press-fit diode housing in a particularly advantageous manner, making it possible to dispense with complex redesigns or new designs of the generator or the associated rectifier and making it possible to refine or improve conventional generators in such a way that they operate with lower losses. The generator according to the exemplary embodiments and/or exemplary methods of the present invention and the associated rectifier system are advantageously used to increase the efficiency of the generator, and as a consequence of the lower losses, the maximum temperatures are reduced without it being necessary to modify the mechanical design of the generator or rectifier compared to conventional generators or rectifiers.

Exemplary embodiments of the present invention are depicted in the drawings and will be explained in greater detail in the following description.

DETAILED DESCRIPTION

Figure 1:
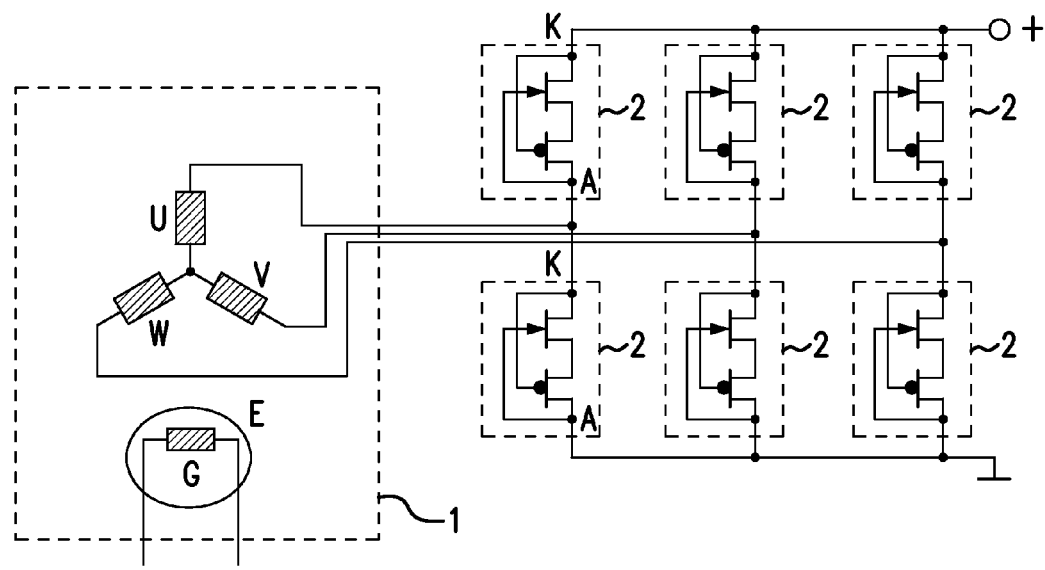
FIG. 1 shows a first exemplary embodiment of a generator including an associated rectifier in a circuit diagram.

FIG. 1 shows a first exemplary embodiment of a generator according to the present invention together with an associated rectifier system having the rectifying elements of the present invention. Reference numeral 1 denotes a three-phase generator operating in star-connected mode having phases or phase conductors or windings U, V and W and rotatable excitation winding E. For example, a claw pole generator such as is commonly used for motor vehicle generators may be used in particular as generator or three-phase generator 1. However, other generators including those having more than three phase windings may be used. Another electrical circuit within the generator, such as a triangular circuit, is also possible.

It is essential that rectifying element 2, which corresponds to a diode in a conventional generator, has a special design. For example, rectifying element 2 is made up of a series connection of a self-conducting n-channel JFET (junction field effect transistor) and a self-conducting p-channel JFET, the particular gate terminals being connected to the particular drain or source terminals of the other JFET which represent the contact to the outside. The contacts to the outside are anode A and cathode K. The connection of six rectifying elements 2 to the three-phase generator or its phases or windings U, V, W is shown in FIG. 1. The rectified output voltage of the generator is produced between the positive output terminal and ground, the output voltage being used for supplying power to the electrical system and charging the battery (neither is shown). It is possible to package and connect both transistors of a rectifying element 2 in one housing. It is particularly advantageous to package the transistors in a conventional press-fit housing.

Figure 2:
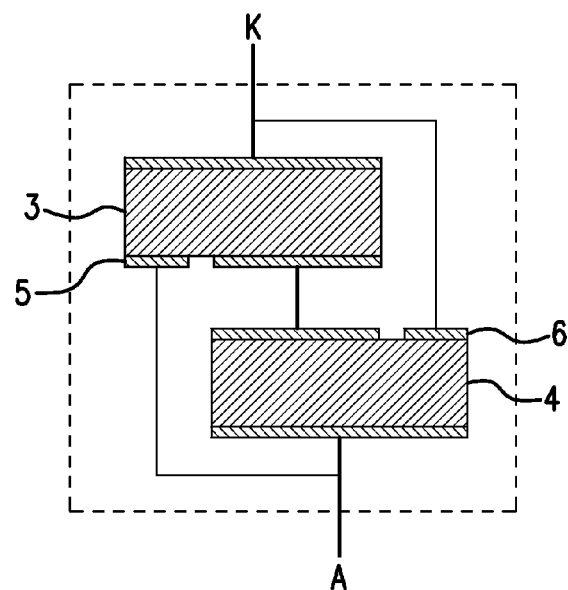
FIG. 2 shows the structure and circuit design of a rectifying element.

The design and circuitry of a rectifying element 2 having two junction field effect transistors (JFET) are shown schematically in FIG. 2. The two terminal connections of rectifying element 2 are denoted as anode A and cathode K. The n-channel JFET is denoted by reference numeral 3 and the p-channel JFET by reference numeral 4. Reference numerals 5 and 6 denote the individual gate terminals. The drain and source terminals are not provided with a reference numeral in the drawing.

Figure 3:
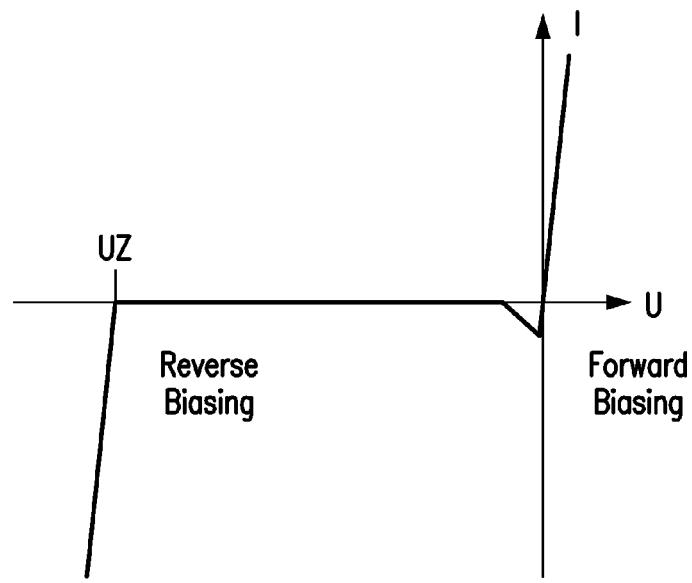
FIG. 3 shows the electrical characteristic curve of a rectifying element according to FIG. 2 in arbitrary units and FIG. 4 shows another exemplary embodiment of the present invention in a circuit diagram.

FIG. 3 illustrates the electrical characteristics of a system or a rectifying element according to FIG. 2. If a positive voltage is applied to terminal or anode A of rectifying element 2, it behaves like a very low resistance resistor. Thus the voltage drop is low. At very high currents, the gate-pn junctions are finally driven into forward mode, resulting in a diode characteristic. However, if this operating state is not advantageous, the components are therefore designed in such a way that the voltage drop remains significantly lower than a forward voltage.

If a negative voltage is applied to terminal or anode A of a rectifying element 2, it also behaves like a very low resistance resistor in the first moment. However, if the voltage is limited as the current increases and then rapidly drops to a negligible reverse current (feedback), a suitable design of the JFETs makes it possible, for example, to switch off the current when the reverse voltage reaches 1 volt. A further increase of the voltage does not result in a current increase. At a voltage corresponding to the sum of the gate-source or gate-drain breakdown voltage of the JFETs, the known avalanche breakdown in pn-junctions occurs, preventing a further voltage rise. As in Zener diodes, this operating mode may be advantageously used for limiting the generator voltage in the load-dump case.

Figure 4:
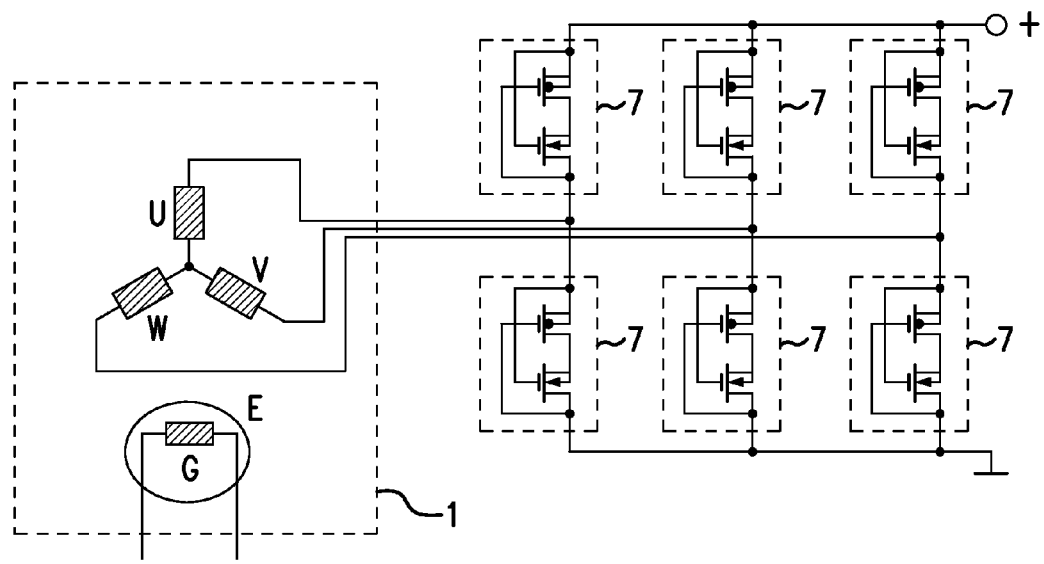

A circuit diagram of another exemplary embodiment according to the present invention is shown in FIG. 4. In this case, the self-conducting JFETs of rectifying element 2 in FIG. 1 are replaced by self-conducting MOS field effect transistors (depletion mode MOSFET). The associated rectifier system is shown with rectifying elements 7 in FIG. 4. The p-channel JFET of the exemplary embodiment according to FIG. 1 is replaced by a self-conducting p-channel MOSFET and the re-channel JFET is replaced by a self-conducting n-channel MOSFET. Again, the gate terminals are connected to the diametrically opposed external terminals similar to the connection of the rectifier system to rectifying elements 2 in FIG. 1 or 7 in FIG. 4. These two transistors may also be mounted together in one housing, for example in a press-fit housing. Again, no substantial changes are necessary for assembly with a (conventional) three-phase generator.

What is claimed is:

1. A generator, comprising:
a generator arrangement; and
an associated rectifier system for rectifying AC voltage produced by the generator arrangement;
wherein the rectifier system includes series connections of at least six rectifying elements, and wherein the rectifying elements are made up of a series connection of a self-conducting n-channel junction field effect transistor (JFET) and a self-conducting p-channel junction field effect transistor (JFET), in which gate terminals are directly connected to an outer source or drain contacts of the respectively other field effect transistor.

2. A generator, comprising:
a generator arrangement including at least three windings; and
an associated rectifier system for rectifying AC voltage produced by the generator arrangement;
wherein the rectifier system includes at least six rectifying elements, each of the windings being connected by one rectifying element to a positive output terminal and by one of the rectifying elements to a ground terminal, and wherein each rectifying elements is made up of a series connection of a self-conducting (depletion mode) n-channel MOSFET and a self-conducting p-channel MOSFET, gate terminals being respectively connected to an outer source or drain contacts of the respectively other MOSFET, and wherein no gate terminal of any MOSFET connected to one of the windings is connected to another one of the windings.

3. The generator of claim 1, wherein an integrated voltage limitation is present as a load-dump protection.

4. The generator of claim 3, wherein a limit voltage of the integrated voltage limitation corresponds to a sum of reverse voltages of the two junction field effect transistors (JFETs).

5. The generator of claim 1, wherein the rectifying elements are integrated in a bipolar press-fit diode housing.

6. The generator of claim 1, wherein the generator has three phase conductors.

7. The generator of claim 1, wherein the generator has more than three phase conductors.

8. The generator of claim 2, wherein a limit voltage of an integrated voltage limitation corresponds to a sum of reverse voltages of the two MOSFETs.

9. The generator of claim 1, wherein an integrated voltage limitation is present as a load-dump protection, and wherein the rectifying elements are integrated in a bipolar press-fit diode housing.

10. The generator of claim 9, wherein a limit voltage of the integrated voltage limitation corresponds to a sum of reverse voltages of the two junction field effect transistors (JFETs).

11. The generator of claim 10, wherein the generator has three phase conductors.

12. The generator of claim 9, wherein the generator has three phase conductors.

13. The generator of claim 10, wherein the generator has more than three phase conductors.

14. The generator of claim 9, wherein the generator has more than three phase conductors.

15. The generator of claim 9, wherein a limit voltage of the integrated voltage limitation corresponds to a sum of reverse voltages of the two JFETs.

* * * * *